(12) United States Patent
Pietre-Cambacedes et al.

(10) Patent No.: US 8,819,438 B2
(45) Date of Patent: Aug. 26, 2014

(54) METHOD AND DEVICE FOR ISSUING A DIGITAL RESIDENCE CERTIFICATE

(75) Inventors: Ludovic Pietre-Cambacedes, Paris (FR); Yves Dherbecourt, Bourg-la-Reine (FR)

(73) Assignee: Electricite de France, Paris (FR)

( * ) Notice: Subject to any disclaimer, the term of this patent is extended or adjusted under 35 U.S.C. 154(b) by 317 days.

(21) Appl. No.: 12/934,413

(22) PCT Filed: Mar. 27, 2009

(86) PCT No.: PCT/EP2009/053684
§ 371 (c)(1),
(2), (4) Date: Sep. 24, 2010

(87) PCT Pub. No.: WO2009/118416
PCT Pub. Date: Oct. 1, 2009

(65) Prior Publication Data
US 2011/0022845 A1     Jan. 27, 2011

(30) Foreign Application Priority Data

Mar. 28, 2008 (FR) ...................................... 08 52059

(51) Int. Cl.
*H04L 9/32* (2006.01)
*H04L 29/08* (2006.01)
*G01D 4/00* (2006.01)
*H04W 4/02* (2009.01)
*H04L 12/28* (2006.01)

(52) U.S. Cl.
CPC ............ *H04L 67/025* (2013.01); *H04L 67/125* (2013.01); *H04L 67/24* (2013.01); *Y04S 20/42* (2013.01); *G01D 4/004* (2013.01); *H04L 67/12* (2013.01); *H04W 4/02* (2013.01); *H04L 67/18* (2013.01); *Y02B 90/246* (2013.01); *Y04S 20/322* (2013.01); *Y02B 90/242* (2013.01); *H04L 12/2825* (2013.01)
USPC ................. 713/175; 713/168; 726/4; 726/30; 702/45; 702/62

(58) Field of Classification Search
CPC ... H04L 63/126; H04L 63/0823; G06F 21/71; G06F 21/86
See application file for complete search history.

(56) References Cited

U.S. PATENT DOCUMENTS 5,086,292 A * 2/1992 Johnson et al. ................ 340/637
6,088,659 A * 7/2000 Kelley et al. .................... 702/62
(Continued)

FOREIGN PATENT DOCUMENTS

WO    WO 2007/047947 A2    4/2007
WO    WO 2007/132473 A1    11/2007

OTHER PUBLICATIONS

Cisco, "Cisco Outdoor Wireless Solutions—Automated Meter Reading," Cisco Systems 2006, Retrieved on Oct. 4, 2012, Online: http://www.cisco.com/en/US/solutions/collateral/ns340/ns394/ns348/ns621/networking_solution_at_a_glance0900aecd805fec84.pdf.*

*Primary Examiner* — Jung Kim
*Assistant Examiner* — Robert Leung
(74) *Attorney, Agent, or Firm* — Drinker Biddle & Reath LLP

(57) ABSTRACT

A method for issuing a digital residence certificate using a module associated with a counter. Data from the counter are continuously monitored, whereby the data are read and a consistency test is performed on the basis of a predetermined criterion. In addition, after receiving a residence certificate request, a decision is made as to whether or not the request should be fulfilled, based on the results of the continuous data monitoring.

15 Claims, 3 Drawing Sheets

(56) References Cited

U.S. PATENT DOCUMENTS

| | | | |
|---|---|---|---|
| 6,118,269 A * | 9/2000 | Davis | 324/110 |
| 6,430,688 B1 * | 8/2002 | Kohl et al. | 713/156 |
| 6,662,230 B1 * | 12/2003 | Eichstaedt et al. | 709/229 |
| 2005/0003940 A1 * | 1/2005 | Thieman | 493/213 |
| 2006/0071812 A1 * | 4/2006 | Mason et al. | 340/870.02 |
| 2006/0206433 A1 * | 9/2006 | Scoggins | 705/63 |
| 2007/0103335 A1 * | 5/2007 | Fitzgerald et al. | 340/870.02 |
| 2007/0247331 A1 | 10/2007 | Angelis et al. | |
| 2007/0257813 A1 * | 11/2007 | Vaswani et al. | 340/870.02 |
| 2008/0272934 A1 * | 11/2008 | Wang et al. | 340/870.11 |
| 2009/0045976 A1 * | 2/2009 | Zoldi et al. | 340/870.02 |

* cited by examiner

METHOD AND DEVICE FOR ISSUING A DIGITAL RESIDENCE CERTIFICATE

CROSS-REFERENCE TO RELATED APPLICATIONS

This application is the U.S. national phase of the International Patent Application No. PCT/EP2009/053684 filed Mar. 27, 2009, which claims the benefit of French Application No. 08 52059 filed Mar. 28, 2008, the entire content of which is incorporated herein by reference.

FIELD OF THE INVENTION

The invention concerns the issue of a digital residence certificate by a module anchored to its premises.

BACKGROUND

Premises here means both a residence or commercial premises or any other premises which might require the residency of their owner or occupier to be authenticated or other information relating to them to be authenticated.

A module anchored to its premises here means a system, optionally distributed, which is inseparably linked or attached to the premises in which it is located. Such attachment is not supposed to be broken during normal usage of the module.

A digital residence certificate here means a means of obtaining, in complete security, reliable information with regard to the premises from which it is transmitted.

Such a residence certificate may be produced to confirm the residency of the person supplying it. For example, a user of a commercial or administrative service may be asked to confirm his regular residency in premises. Such confirmation may make it possible to identify a person, to prove his place of residency or even to make it possible to find him or her.

A confirmation in current usage consists for example of the production of invoicing documents for services which may be regularly rendered and associated with the premises. Such services may in particular be the supply of electrical energy or gas, access to a telecommunications network or even the supply of running water. Such services may also be home delivery services or intangible services involving the supply of electronic content.

The supply of such services providing for confirmation of residency requires a piece of equipment identified as belonging to the premises the integrity of which must be maintained in normal operation. Furthermore, it is preferable that such equipment is connected to communication networks. Such equipment may in particular be meters.

There is at the present no computer tool which is able to issue a digital residence certificate without delay and upon request.

SUMMARY

Embodiments of the invention will improve this situation.

According to a first approach, a module issuing digital residence certificates is associated with a consumption meter, such as for example an electricity consumption meter. In a particular embodiment, it is proposed to take advantage of the information provided by the meter in order to ensure the consistency of this information and, hence, the integrity of the module/meter connection.

Electrical energy consumption meters are installed in a fixed manner, generally in premises for which they indicate the total electrical energy consumed based on an electrical network supplying the premises. Each meter is uniquely identifiable by means of its serial number. The electrical network to which it is connected is by nature inseparable from the premises. The serial number thus identifies the premises in which it is located, providing the meter is not broken into and/or relocated.

The meter may advantageously present an interface communicating via a communication network, allowing it to supply information relating to the consumption of electrical energy in the premises in which it is located.

The meter may thus send information to a receiving module, which is responsible for processing it.

Embodiments of the invention make it possible to issue a digital residence certificate based on data associated with a consumption meter attached to premises in a unique and fixed manner.

For this purpose, there is proposed a method implemented by computer facilities for the conditional issue of a digital residence certificate, the residence having at least one consumption meter measuring fluid or electricity supplying it, the meter being designed to recurrently send data corresponding to a current state of the meter.

The method according to embodiments of the invention comprises continuous monitoring of the data with, for each new transmission of data, a reading of the data sent by the meter and a consistency test on the data read, on the basis of at least one predetermined criterion. After receiving a residence certificate request, the method then comprises a step in which a decision is made as to whether or not to fulfil the request, based on a result of said continuous data monitoring.

Thus, it is possible to issue a residence certificate on the strength of information taken in real time and associated unequivocally with the residence.

Embodiments of the invention may be used in particular as part of a secure transaction requiring a digital residence certificate.

It will be noted that it allows information concerning the premises to be obtained rapidly and reliably.

The above mentioned computer resources may include means of calculation and also means of storing data.

The information which the meter can supply may be changing (such as for example consumption) or unchanging. Advantageously, this type of unchanging information may be used to initialise continuous monitoring.

Thus, the means of storage may be used to store reference data used to initialise continuous monitoring.

Advantageously, the reference data and the data sent by the meter comprise at least meter identification data and the predetermined criterion comprises at least one verification of a meter identifier.

Thus, the identification of the meter can itself be verified first of all to ensure that the module has not been separated, even temporarily, from the meter.

The meter identifier may be a secret code.

In addition or as a variant, the data sent by the meter may change from one transmission to the next and the method then comprises a reading followed by storage of the data from a first transmission and a reading of data in a second transmission, which follows the first transmission with a view to performing a consistency test between the data in the first and second transmissions. These two steps are preferentially repeated on the basis of the recurrence of transmissions from the meter.

This embodiment advantageously makes it possible to become aware of an attempted attack on the integrity of the module/meter connection, in particular in the event of a one-off reduction in the change in consumption and/or an abnormal jump in consumption (consumption greatly increased over a short period of time).

Thus, the method may comprise a verification of a consistent increase in a consumption value contained in the data sent by the meter, a verification of the consistency of the user profile data contained in the data sent by the meter, and a verification of the data representative of the status of the meter ("integrity assured" status or "integrity violated" status) contained in the data sent by the meter.

According to another advantageous optional feature, the data sent by the meter are sent by recurrent frames and the consistency test relates to a comparison of a current frame with a preceding frame.

Thus, in the event of inconsistency in the format of a frame, or in the event of an erroneous frame, the module may suspect an attack on the integrity of the connection with the meter.

Thus, the predetermined criterion may comprise verification of a format of frames sent by the meter.

These different possible tests can be used to verify that the data sent do not contain any errors, which might mean that a malicious third party is attempting to disconnect the module from the meter so that the residence certificate supplied would no longer be valid.

Thus, in the event of non-fulfilment of consistency tests, any future requests for a residence certificate are blocked in a lasting manner, the block only being able to be lifted by an external authority. A block may however be lifted by a user of the module and the meter in the event of non-fulfilment of the consistency test relating to the user profile (in particular in the event of a change in profile following the use of a new electrical household or other appliance, for example).

Thus, when an anomaly is detected, the module does not issue a certificate. The status of the meter is preferentially verified before any new production of a certificate.

The present invention also relates to the module for the conditional issue of a digital residence certificate. This module comprises:
- a first communication interface with at least one meter measuring fluid or electricity supplying a residence, in order to recurrently receive from the meter data corresponding to a current state of the meter,
- a second communication interface with at least one entity requiring a digital residence certificate,
- means of at least temporary storage of identification data sent by the meter,
- means of processing for comparing current data received from the first interface with data previously stored by the means of storage in order to cooperate, following receipt by the second interface of a request for a residence certificate, with the second interface in order to fulfil or not to fulfil the request, on the basis of the verification of consistency.

Thus, the module globally comprises means for implementing the method described above.

The first communication interface may be connected to the meter by a wired link or by a short-range wireless link.

Advantageously, the module comprises a protective casing and a device to detect opening of the casing.

Thus, unauthorised handling of the module may be detected and give rise to a block on the issue of residence certificates.

The invention also relates to the application of the method in the meaning of the invention to a secure transaction requiring a digital residence certificate.

The invention also relates to a data processing system for a secure transaction requiring a digital residence certificate, the system comprising:
- an entity requiring a digital residence certificate,
- a meter for measuring fluid or electricity in a residence.

In the meaning of the invention, the system also includes a module for the conditional issue of a digital residence certificate as described above.

Preferentially, the module is integrated with the meter, any attempt at physical separation of the module and the meter being likely to generate a block on the module.

Advantageously, the entity requiring a digital residence certificate may be a remote server connected to the module by a wide area network, such as the Internet for example.

The invention also relates to a computer program intended to be stored in a memory of a module for the conditional issue of a digital residence certificate, and thus comprising instructions for the implementation of the method according to the invention.

BRIEF DESCRIPTION OF THE DRAWINGS

Further features and advantages of the invention will become apparent upon examination of the detailed description below and the attached drawings, in which.

DETAILED DESCRIPTION

Figure 1:
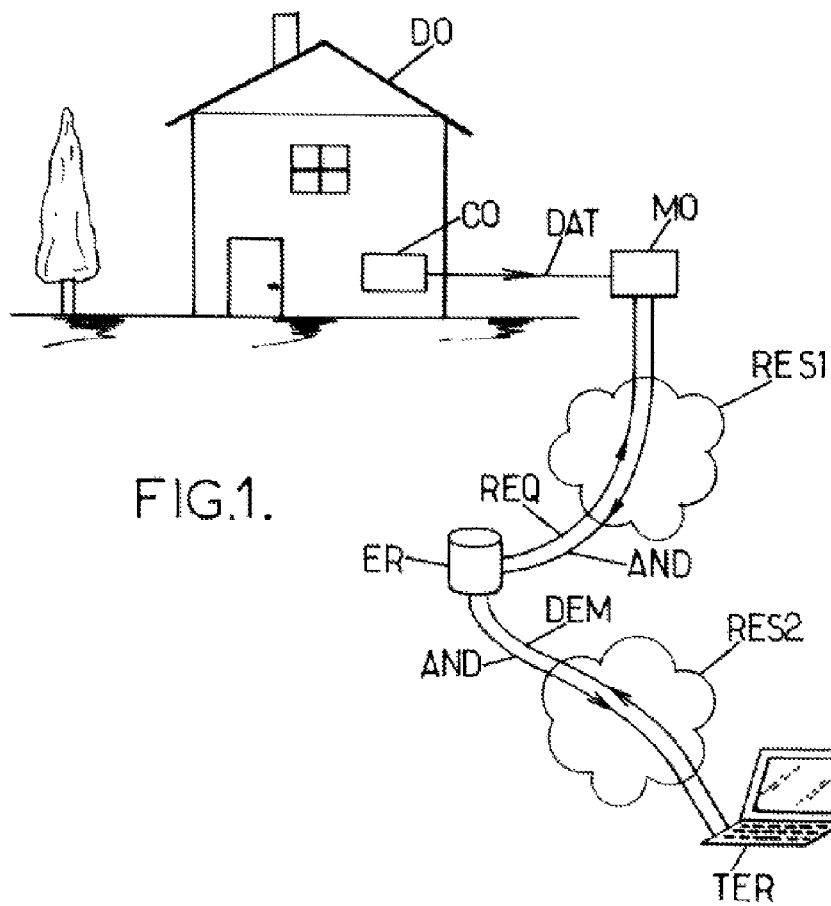
FIG. 1 illustrates a general context of application of the method according to embodiments of the invention.

Referring to FIG. 1, a meter CO is connected to a residence DO. The meter may be in particular a meter for measuring the consumption of electrical energy, gas, water and may be considered more extensively. The meter CO is preferentially attached to the residence. For example, it is built into a wall. However, it is possible for it to be attached in a more or less irreversible manner. It will be maintained that the meter should be physically secured to the residence. It must be possible to be sure that the meter is located within the residence.

The residence DO may be a house, commercial premises or offices or even a production site. All these examples do not limit the residences DO to which the present invention relates.

A module MO is connected to the meter CO. Since the meter CO is itself attached to the residence DO, the module MO is anchored to the residence DO. This module is intended in particular to process and store information originating from the meter CO. Said processing and said storage are advantageously applied here with a view to establishing a digital residence certificate. The digital residence certificate may be used by a person to confirm the authenticity of certain information, in particular residency in the residence DO. This digital residence certificate may also be used by services or electronic applications or by computer entities belonging to a home network in the residence. In this last case, the digital residence certificate is exchanged between machines. The module MO is described in more detail below.

The meter CO sends data DAT to the module MO. These data may be of several kinds. They may be, non-limitatively, data indicating a consumption measured by the meter or the identity of the resident or also a meter status.

The module MO communicates with a requesting entity ER over a communications network RES1. The entity ER, for example a remote server, transfers to the module MO requests REQ for a digital residence certificate AND and the module MO produces and issues digital residence certificates AND, in particular to the entity ER.

The network RES1 is a wide area network, allowing for real-time communication of information between different remote units. This wide area network may be, for example, the Internet.

The entity ER communicates with a terminal TER over a communications network RES2. This terminal TER may be for example a computer station available to an administrative or banking authority or available at a merchant's premises for a payment requiring a digital residence certificate. The entity ER may then transmit in particular to the terminal TER digital residence certificates AND originating from the module MO. The terminal TER issues requests DEM for a digital residence certificate, in particular to the entity ER.

The network RES2 is a wide area network, providing for real-time communication of information among different remote units. This network may be the same as the network RES1 or a network distinct from the network RES1.

The terminal TER may, for example, be located at the premises of a merchant to whom the resident of the residence DOM is making a payment. In order to secure the transaction, the merchant may ask for a digital residence certificate AND. He then sends a request DEM to the entity ER over the network RES2.

The digital residence certificate may allow the merchant to verify the conformity of information concerning the residency of the resident shown, on the one hand, on a means of payment presented by the resident and that indicated, on the other hand, by the digital residence certificate.

The entity ER is a central server, forming an interface between a module MO located in a residence DO and a terminal TER. The entity ER, upon receipt of the request DEM from the merchant, is responsible for recovering the digital residence certificate from the module MO and, if necessary, transmitting it to the merchant.

The entity ER makes it possible, for example, to share the capacity for communication with the terminals among several modules MO.

However, an embodiment of the invention might be envisaged where the terminals communicate directly with the modules MO.

Thus, the merchant may verify the address of his client and be assured of being able to find him.

Figure 5:
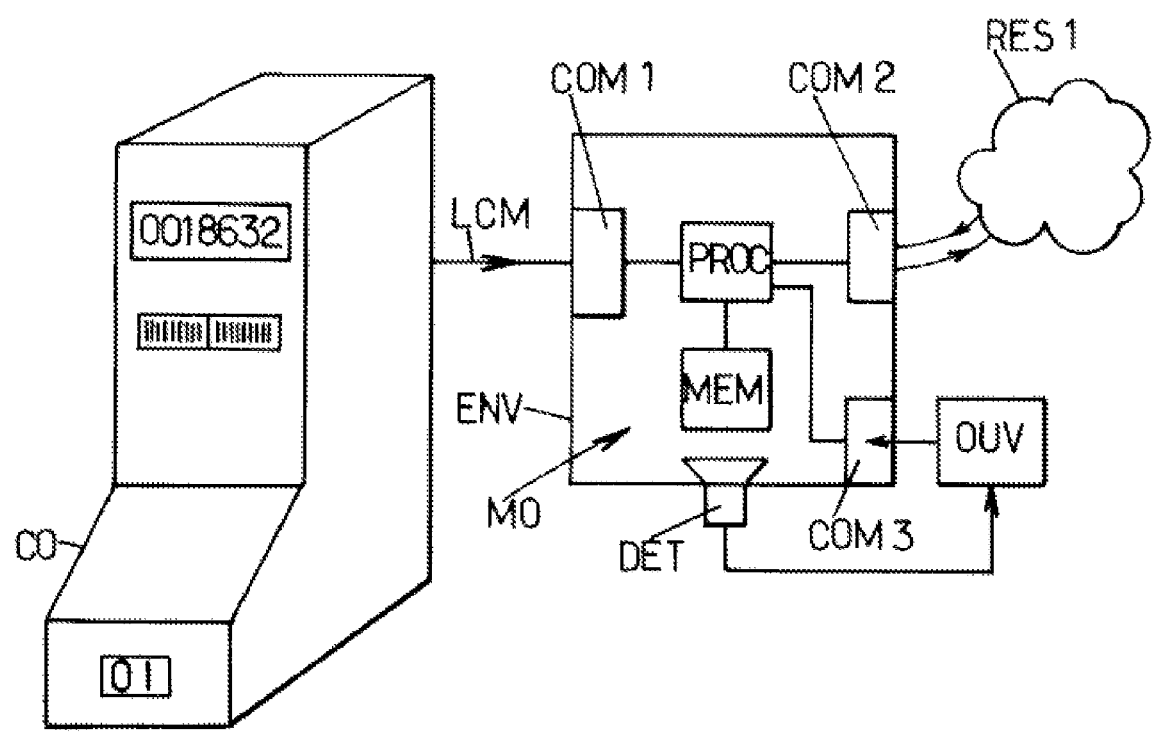
FIG. 5 illustrates a module for the issue of a digital residence certificate according to an embodiment of the invention.

The module MO is described in detail here by reference to FIG. 5.

The module MO is delimited by a casing ENV and it contains in particular one or more elements of information storage MEM, a processor PROC, communication interfaces COM1, COM2, COM3, and a device to detect opening of the casing DET.

The module MO communicates in particular with the meter CO and with remote units over the network RES1, such as the server CA, and a casing open alert unit OUV.

As regards the storage elements MEM, several types are possible. This may involve "live" memory elements, i.e. the information they contain is only stored and accessible when the system is powered up. Reference may be made, for example, to RAM memory or RWM memory. It may also involve "dead" memory elements, i.e. the information they contain is maintained even when the system is switched off. Reference may be made, for example, to memories of the magnetic disk type or flash memories. Of course, both types of memory may be combined within the same module MO, each type being used depending on the information to be stored. For example, data concerning the identity of the resident are only modified upon each change in the occupant of the residence DO. Since this event only occurs infrequently, such data may be stored in a "dead" memory. For example again, upon receipt of a frame of data DAT by the module MO, this frame may be stored in a "live" memory for comparison with the following frame in order of arrival. The use of a type of memory depending on the type of data to be stored will be obvious to a person skilled in the art.

As regards the processor PROC, this involves an information processing circuit providing for the operations to be described below. This type of circuit may be of the ASIC or FPGA type and it may also involve a microcontroller. The processor communicates with a memory MEM and is designed to receive information originating directly or indirectly from the communication interfaces COM1, COM2, COM3.

As regards the communication interfaces COM1, COM2, COM3, each one is intended to receive and/or supply information originating from and/or intended for several external elements.

The interface COM1 is connected preferentially to the meter CO. It provides for receiving in particular information concerning a current meter state, a consumption measured by the meter, an identification of the meter, its integrity, etc.

The interface COM1 is connected to the meter CO by a connection LCM. This connection may be a wired connection or a short-range wireless connection.

The interface COM2 is connected to the network RES1. It provides for receiving and sending information to remote units, themselves also connected to the network RES1. The interface COM2 receives in particular digital residence certificate requests REQ originating from the remote entity ER. The interface COM2 sends in particular digital residence certificates intended for the entity ER.

The interface COM3 is connected to the casing open alert unit OUV. The interface COM3 receives information concerning the physical integrity of the casing ENV on the module MO. When such information indicates that the casing is open or tampered with, it is taken into account by the module MO in order to stop issuing digital residence certificates.

In fact, opening of the casing may indicate an attempted fraud when such opening has not been carried out by an external authority, guarantor of the legal validity of the digital residence certificate. A fraud may, for example, consist of separating the module MO from the residence DO to which it is anchored to connect it to another residence in order falsely to confirm a residency.

The casing open detector DET is intended to indicate to the casing open alert unit, a change in the state of the casing. In normal operation, the casing ENV is sealed and only the external authority can remove and apply the seal. Any modification of the seal made by an entity other than the authority is interpreted as an attempted fraud or a malfunction and gives rise to a suspension of issue of the digital residence certificate. The detector DET is, for example, sensitive to light. Means such as a photodiode cell may be envisaged. The casing ENV is totally opaque to light and the interior of the module MO is plunged in darkness. When the casing ENV is opened, external light penetrates into the casing and is detected by the detector DET. This detector may also be an electrical switch which breaks an electrical contact when the casing is opened. Other types of detector are possible and may be advantageously coupled to those described here. The casing open alert unit may make it possible to inhibit the signal originating from the detector when the external authority opens the casing ENV, for example for maintenance by the external authority.

Figure 3:
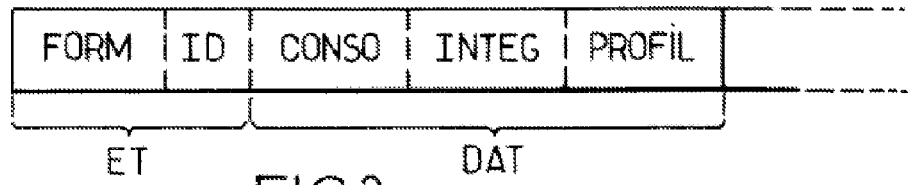
FIG. 3 illustrates the format of a frame of data sent by the meter, in an example embodiment.

The data sent by the meter CO to the module MO conform to a frame represented on FIG. 3.

This frame comprises a header ET and data DAT.

The header ET comprises a field FORM relating to the format of the frame. This field FORM may for example correspond to check bits in the coding of the information contained in the field DATA. For example FORM may be a checksum. The field ID of the header ET also contains an identification of the meter CO. This identification is in particular used during an initialisation phase for the module MO.

The module MO is not initially linked to the meter CO, with which it is going to be associated. When the module is initialised, it has to recognise a meter to which it will be lastingly linked. Upon first powering up, the module MO listens to its interface COM1 and awaits a message from a meter to which it is going to be linked. Once it has received a frame, it reads the field ID in the header. Henceforth, the module MO memorises this identity in a lasting manner and then verifies that all the messages arriving through interface COM1 have the same field ID.

The DAT part of the frame comprises several fields, each corresponding to an item of information relating to the meter: the consumption measured, the integrity of the meter CO and the user profile, which will be defined below.

Figure 2:
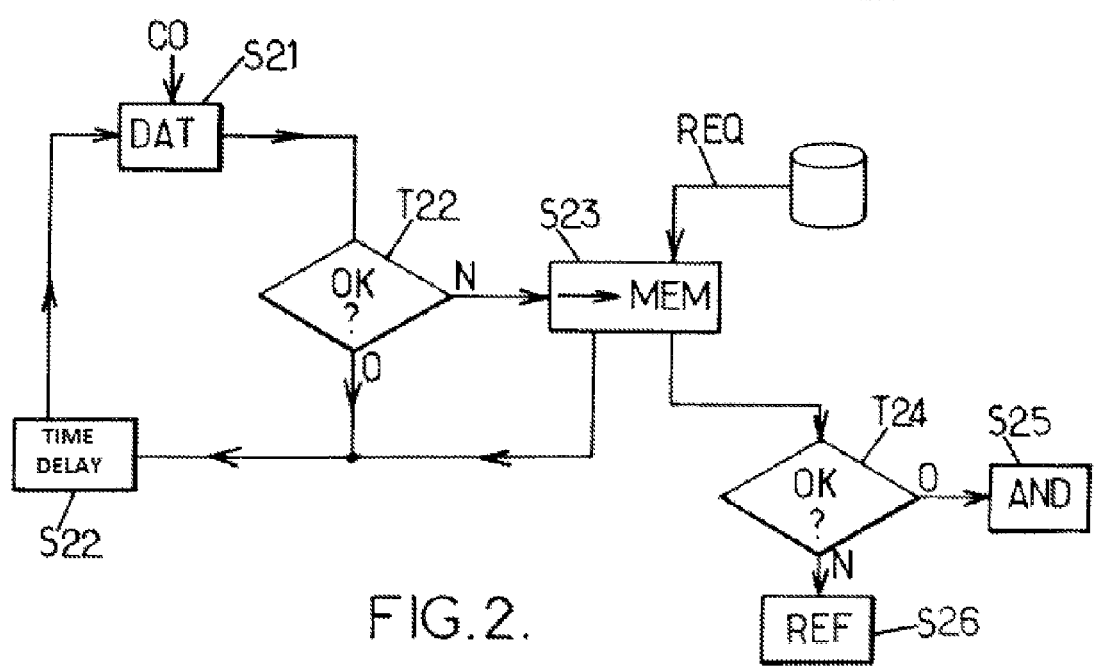
FIG. 2 illustrates the main steps of the method between the generation of data by the meter and the issue or non-issue of a digital residence certificate, in an example embodiment.

The method for conditional issue of a residence certificate is described here by reference to FIG. 2.

The module MO for issuing a residence certificate DO receives, in step S21, data originating from the meter CO.

The data received are then read and subjected to a consistency test T22. This test performs verifications, which will be detailed below, on the basis of predetermined criteria and stored lastingly within the module MO.

If the test T22 is successful, i.e. the frame received verifies a predetermined format and the data DAT contained in this frame fulfil the predetermined criteria, the data are processed. For example, they are stored within the module MO with a view to performing statistical calculations, raising an invoice on the basis of the consumption measured or of course drawing up a digital residence certificate.

Once the test is finished, the system enters a step S22 awaiting the next data originating from the meter CO.

When the test T22 fails, the failure information, and optionally further details, is stored within the module MO during a step S23.

The decision to issue or not to issue a digital residence certificate is taken during a test T24 within the module MO. This decision is taken on the basis of information produced by consistency tests T22. For example, a casing detection will give rise to a rejection.

When the test T24 is successful, a digital residence certificate AND is generated in step S25.

When the test T24 fails, a refusal to issue a digital residence certificate REF is generated in step S26.

Figure 4:
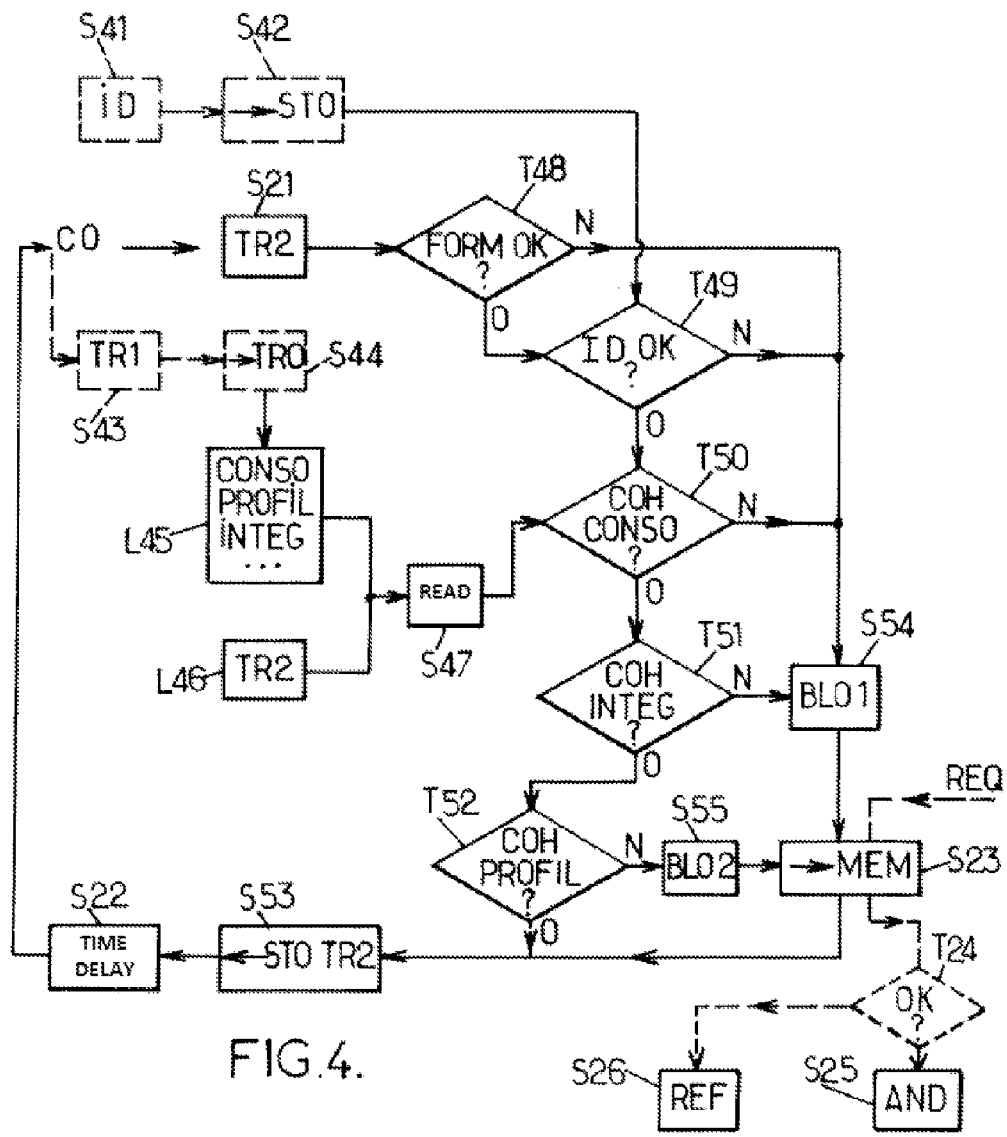
FIG. 4 illustrates in detail an example embodiment of the method according to embodiments of the invention, steps from the generation of data by the meter to the decision to issue or not to issue a digital residence certificate

By reference to FIG. 4, a more precise description is given here of the different verifications performed during the consistency test T22 and their consequences.

Reference data are generated during a step S41. They are used during the different verifications in the different tests. They include elements which can be used to identify the meter CO from which the data originate, as well as identification elements corresponding to the residence DO and to the occupant of this residence.

The reference data comprise in particular an identification of the meter CO, a criterion of normal change in consumption CONSO and a user profile PROFIL.

The identification of the meter may consist of its serial number. During the initialisation of the module MO, the latter is stored during a step S42. Subsequently, the module MO may thus recognise information originating from the meter by reading the field ID in the header ET of the frames of data.

The criterion of normal change in consumption is a predefined rule making it possible, depending on the current data on change in consumption (such as for example readings at regular intervals), to know whether the consumption measured by the meter is following an anticipated path in relation to the preceding readings. For example, consumption lower than the preceding reading cannot be envisaged. Nor can a sharp and unexplained jump in consumption with respect to the average consumption over the preceding readings be envisaged.

This rule may be pre-established in an arbitrary manner by the external authority or the service provider. It may also be established progressively, taking account of a change in consumption. Thus, it is possible to verify that the consumption is not zero for more than a determined period. It is also possible to verify that the consumption is not dropping. Such a finding would necessarily mean a malfunction or that the module MO has been anchored to a residence other than that intended.

The user profile is a typical consumption associated with the occupant of the residence DO. Depending on the occupant, the consumption differs in quantity and in changes. Thus, it is possible to detect a change in consumption and to detect the departure of an occupant. For example, user profiles may be: domestic premises, office, industrial workshop or other profiles.

All these data are generated in a one-off or progressive manner during step S41 and are stored lastingly during step S42.

When a frame of data arrives from the meter CO in the step S21 already described, it is read and its form is verified during the test T48. This test relates to the form of the frame of data and is intended to verify that it contains the different fields of data expected and that the frame is not corrupted. This verification may be performed by means of the field FORM in the header ET of the frame, as will be obvious to a person skilled in the art.

If the test T48 fails, lasting block BLO1 takes place in step S54. This step is described in more detail below.

If test T48 is successful, test T49 is performed.

During test T49, the identification of the meter transmitting the frame is verified. The field ID in the header of the frame is compared with a predetermined value in step S41 and stored in step S42.

If these two pieces of information are not in agreement, lasting block BLO1 takes place in step S54, as described below.

If these two pieces of information are in agreement, then the frame originates from the meter CO in the residence to which the module MO is anchored and test T50 is performed.

Test T50 deals with the consistency of change in consumption CONSO, measured by the meter CO. This test compares a current frame L46 with a preceding frame L45. This comparison is performed in accordance with a criterion of normal change in consumption, predetermined in step S41 and stored in step S42.

The frame L45 is transmitted by the meter CO and read during step S43. The verifications of its form and the identification of the transmitter may have already been performed. Information contained in the frame, in particular consumption CONSO, user profile PROFIL, and integrity INTEG of the meter, are then stored in step S44 in temporary storage.

When the current frame L46 arrives, it is read and optionally tested with respect to its form and the identification of the transmitter. The information it contains is read and compared with the information stored during step S44 to step S47.

These data are then subjected to test T50.

When the test fails, lasting block BLO1 takes place in step S54, as described below.

If the test is successful, test T51 on the integrity of the meter CO takes place.

This test is intended to confirm that there has been no handling by anyone other than the external authority. Verification of the signals originating from the casing open alert unit ENV is performed.

When the test fails, lasting block BLO1 takes place in step S54, as described below. Otherwise, test T52 to verify the consistency of the user profile is performed.

This test verifies that the consumption measured by the meter CO is following a path expected by the external authority with regard to the occupant of the residence. This test uses information on change in consumption produced by comparing the current L46 and preceding L45 frames. This test may involve past measurements of consumption which have been lastingly stored, as well as a rule of comparison established in advance and stored lastingly.

If the test T52 is successful, the data in the current frame are stored lastingly in step S53.

Step S22 of awaiting the next frame originating from the meter CO then takes place.

Otherwise, lasting block BLO2 takes place in step S55, which is different from lasting block BLO1 in step S54.

Step S55 blocks the issue of a digital residence certificate. The lasting block BLO2 in this step differs from lasting block BLO1 in step S54 in that it can be lifted by the user. In fact, it may happen that the consumption changes sharply without this being associated with a malfunction or a fraud. For example, if the consumption drops sharply over a certain period of time, it may be that this is simply due to someone going on holiday. Thus, upon returning, the user, after being authenticated, will be able to reactivate the residence certificate generation service. For example again, if the consumption increases greatly, it may be that this is the result of the installation of a new electrical household appliance.

On the other hand, lasting block BLO1 in step S54 cannot be lifted by the user. Only the external authority can do this. This block is applied in cases when a doubt about the incident justifies intervention by this authority.

Once block steps S54 or S55 have occurred, information concerning the block applied is stored lastingly in a memory MEM in step S23, already described.

Of course, the present invention is not restricted to the embodiment described above by way of example; it extends to other variants.

For example, the implementation of some of the steps described may take place in a different order. It would be possible to perform the integrity test T51 before the consumption test T50.

Likewise, the format of the frames of data could be different and moreover contain other fields.

Other embodiments are possible, whereby the decision T24 to issue or not to issue a digital residence certificate is taken within the entity ER. Thus, the module MO transmits all the information needed to produce the digital residence certificate and it is the requesting entity which issues the certificate on the basis of this information.

Of course, it is possible to envisage an embodiment in which the digital residence certificate is directly produced and issued within the residence. Thus, it is possible to envisage a use of the present invention enabling pieces of equipment in a residence to prove to an external element that they belong to the residence. For example, this may make it possible to prove that a piece of equipment is used in its owner's residence and thus to prevent any use of the equipment elsewhere. In this way, theft of the equipment could be deterred.

The invention claimed is:

1. A method implemented by means of computer resources of a module for a conditional issue of a digital residence certificate, for conditionally issuing a digital residence certificate, a residence having at least one meter measuring the consumption of fluid or electricity supplying the residence, the meter being designed to recurrently send data corresponding to a current state of the meter, the method comprising the steps of:
   continuous monitoring of said data with, for each new transmission of data, a reading of the data sent by said meter and a consistency test on the data read, on the basis of at least one predetermined criterion, and
   after receiving a residence certificate request from at least one remote entity, a decision is made as to whether or not to fulfil the request, based on a result of said continuous data monitoring,
   storing of reference data for initialization of the continuous monitoring prior to the continuous monitoring,
   wherein the reference data and the data in each transmission include at least identification data for the meter and said predetermined criterion includes at least one verification of a meter identifier,
   wherein said reference data and the data in each transmission also contains a resident profile, and the predetermined criterion also contains verification of consistency of the resident profile, and
   wherein in the event of non-fulfilment of the consistency test, applying a lasting block to any future residence certificate requests;
   wherein in the event of non-fulfilment of the consistency test relating to the resident profile, applying said lasting block such that it can be lifted by the resident;
   wherein in the event of non-fulfilment of the consistency test relating to a negative verification of the meter identifier, applying said lasting block such that it can only be lifted by an external authority.

2. The method according to claim 1, wherein the data sent by the meter can change from one transmission to the next and the method comprises:
   a) reading of the data in a first transmission, followed by storage of said data,
   b) reading of the data in a second transmission, which follows the first transmission, with a view to performing said consistency test between the data in the first and second transmissions,
   and repetition of steps a) and b) based on the recurrence of transmissions of data sent by the meter.

3. The method according to claim 2, wherein said data comprise at least one consumption value, and the predetermined criterion comprises verification of a consistent increase in consumption, from one transmission to the next.

4. The method according to claim 1, wherein said data also comprise status information representative of the integrity of the meter, and the predetermined criterion also comprises verification of the integrity of the meter.

5. The method according to claim 1, wherein the data originating from the meter are sent in recurrent frames and in that the consistency test relates to the data in a current frame compared with the data in a preceding frame.

6. The method according to claim 5, wherein the predetermined criterion also comprises verification of a format of frames sent by the meter.

7. A module for conditionally issuing a digital residence certificate, said module comprising:
a first communication interface with at least one meter measuring fluid or electricity supplying a residence, in order to recurrently receive from the meter data corresponding to a current state of the meter,
a second communication interface with at least one remote entity to receive residence certificate requests,
storage elements to store identification data sent by said meter and reference data, and a processor for:
comparing current data received from the first interface with data previously stored by the storage elements in order to verify consistency between said current data and the data previously stored, on the basis of at least one predetermined criterion,
following receipt by the second interface of a residence certificate request (REQ), cooperating with said second interface to fulfil or not to fulfil the request, on the basis of said verification of consistency,
wherein a resident profile is contained in said current data received from the first interface, and the predetermined criterion also contains verification of consistency of the resident profile according to said reference data, and
wherein said predetermined criterion includes at least one verification of a meter identifier according to said identification data and said reference data,
in the event of non-fulfilment of the verification of consistency, applying a lasting block to any future residence certificate requests, wherein
in the event of non-fulfilment of the verification of consistency relating to the resident profile, applying said lasting block such that it can be lifted by the resident, whereas
in the event of a negative verification of the meter identifier, applying said lasting block such that it can only be lifted by an external authority.

8. The module according to claim 7, wherein the first communication interface is connected to the meter by a wired link.

9. The module according to claim 7, wherein the first communication interface is connected to the meter by a short-range wireless link.

10. The module according to claim 7, comprising a protective casing and a device to detect opening of the casing.

11. A method of performing a secure transaction requiring a digital residence certificate using the method of claim 1.

12. A data processing system for a secure transaction requiring a digital residence certificate, the system comprising:
an entity requiring a digital residence certificate,
a meter for measuring fluid or electricity in a residence, comprising a module for conditionally issuing a digital residence certificate according to claim 7.

13. The system according to claim 12, wherein the module is integrated into the meter.

14. The system according to claim 12, wherein the entity is a remote server connected to the module by a wide area network.

15. A non-transitory computer readable storage medium, having stored thereon a computer program comprising program instructions, the computer program being loadable into a data-processing unit and adapted to cause the data-processing unit to carry out the steps of claim 1 when the computer program is run by the data-processing device.

* * * * *